United States Patent [19]
Cho et al.

[11] Patent Number: 5,798,951
[45] Date of Patent: Aug. 25, 1998

[54] METHOD AND APPARATUS FOR AUTOMATIC UN-PRECONDITIONED INSERTION/REMOVAL CAPABILITY BETWEEN A NOTEBOOK COMPUTER AND A DOCKING STATION

[75] Inventors: Sung-Soo Cho, Sunnyvale; James P. Kardach; Diane M. Bryant, both of San Jose, all of Calif.

[73] Assignee: Intel Corporation, Santa Clara, Calif.

[21] Appl. No.: 580,933

[22] Filed: Dec. 29, 1995

[51] Int. Cl.$^6$ ........................... G06F 1/16
[52] U.S. Cl. ............ 364/708.1; 361/683; 395/281
[58] Field of Search .............. 364/708.1; 361/683; 395/281

[56] References Cited

U.S. PATENT DOCUMENTS

| | | | |
|---|---|---|---|
| 5,323,291 | 6/1994 | Boyle et al. | 361/683 |
| 5,347,425 | 9/1994 | Herron et al. | 361/683 |
| 5,488,572 | 1/1996 | Belmont | 361/683 |
| 5,526,493 | 6/1996 | Shu | 395/281 |
| 5,596,728 | 1/1997 | Belmont | 395/281 |
| 5,598,537 | 1/1997 | Swanstrom et al. | 395/281 |

*Primary Examiner*—David H. Malzahn
*Attorney, Agent, or Firm*—Blakely, Sokoloff, Taylor & Zafman

[57] ABSTRACT

A system having a portable computer, a docking station and an interface coupled between the portable computer and the docking station that is responsive to unpreconditioned insertion or removal of the portable computer into or from the docking station respectively. When the portable computer is being inserted into or removed from the docking station, the interface generates events to allow software to configure (e.g., precondition) the portable computer and the docking station without prior user intervention.

21 Claims, 5 Drawing Sheets

METHOD AND APPARATUS FOR AUTOMATIC UN-PRECONDITIONED INSERTION/REMOVAL CAPABILITY BETWEEN A NOTEBOOK COMPUTER AND A DOCKING STATION

FIELD OF THE INVENTION

This invention relates to the field of computer systems; more particularly, this invention relates to the insertion and removal of a notebook computer from a docking station.

BACKGROUND OF THE INVENTION

Today, notebook (mobile) computer systems have incorporated many features that were once only available on desktop personal computers. Through the use of a docking station connected to a notebook computer system, a user is allowed to access various services usually only available to desktop computer systems. Thus, when a notebook computer system is connected to, or seated in, a docking station, the resulting system resembles a desktop computer.

A notebook computer system is connected to a docking station through the use of a socket type connection. That is, the notebook computer system is inserted into the docking station, and upon such insertion, connects through the use of a mating connector to the docking station. When disengaging the notebook computer system from the docking station, the computer system is removed from the docking station.

One of the major problems with the current insertion and removal of the computer system from the docking station is that the user must manually intervene before either the insertion or removal process can be performed. It is desirable to be able to provide insertion and removal without user intervention.

The present invention provides for insertion and removal capability between a notebook computer system and a docking station that is automatic. In other words, the present invention provides for an insertion/removal protocol which requires no user intervention.

SUMMARY OF THE INVENTION

A system is described that comprises a portable computer, a docking station and an interface coupled between the portable computer and the docking station. The interface is responsive to unpreconditioned insertion or removal of the portable computer into or from the docking station respectively. When the portable computer is being inserted into or removed from the docking station, the interface generates events to allow software to configure (e.g., precondition) the portable computer and the docking station without prior user intervention.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

An insertions and removal protocol for connecting and disconnecting a notebook computer system to and from a docking station is described. In the following detailed description of the present invention, numerous specific details are set forth, such as specific voltage, event and interrupt names, pin lengths, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Overview of the Invention

The present invention provides an automatic, un-preconditioned insertion/removal protocol between a notebook computer system and a docking station that does not require user intervention. In the present invention, events are used to allow software to configure a notebook computer system and a docking station upon insertion or removal. These events are generated automatically by either the docking station or the notebook computer system. Therefore, the user does not have to manually intervene before the insertion or removal process, as is common in the prior art.

The present invention automatically detects conditions, or states, of the notebook computer system and the docking station to automatically control the power of the notebook computer or the docking station, to generate events for system software interaction, to automatically isolate and enable interconnect signals during the insertion or removal process or while the notebook computer is fully seated to prevent interconnect signals from conflicting, and locates and allocates resources.

Note that the software referred to in the present invention controls the operation of hardware in the computer system and may be implemented in various programming languages. Also the software may be implemented, in full or in part, as firmware.

System Overview

Figure 1:
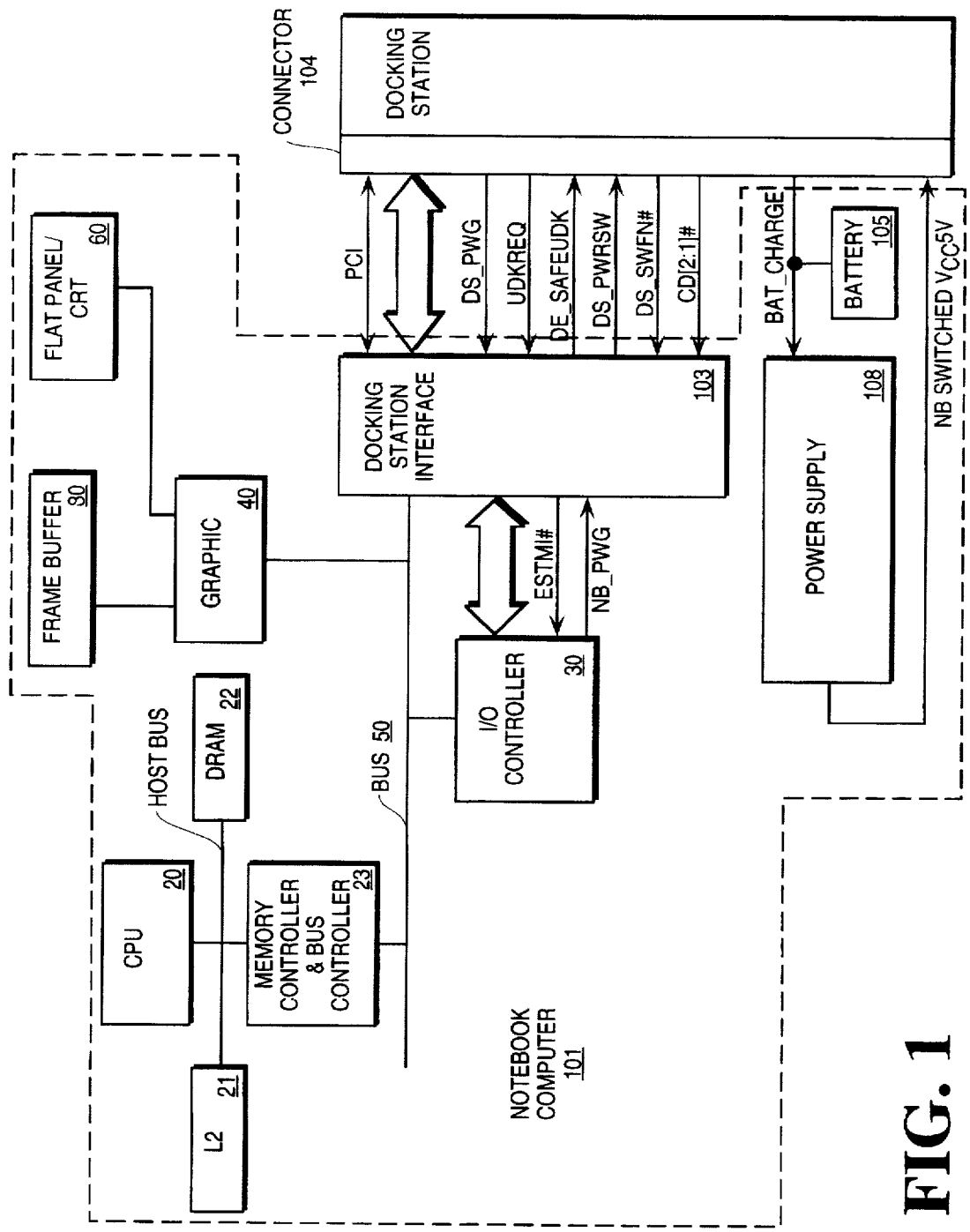
FIG. 1 is block diagram of the computer system of the present invention.

FIG. 1 is a block diagram of the system of the present invention. Referring to FIG. 1, the system 100 includes a docking station 102 and a notebook computer system 101, each shown by dotted lines.

Notebook computer 101 comprises central processing unit (CPU) 20, input/output (IO) controller 30 and graphics controller 40 coupled to interface bus 50 which communicates information between the components on the bus 50. In one embodiment, CPU 20 comprises an Intel Architecture Microprocessor (e.g., i486, Pentium processor™) manufactured by, for instance, Intel Corporation of Santa Clara, Calif., the assignee of the present invention. Such a computer system is compatible with the IBM™ PCAT Personal Computer. In one embodiment, bus 50 is a bus conforming to the PCI Local Bus specification version 2.0, dated Apr. 3, 1993.

Also coupled to CPU 20 is an L2 cache memory 21 and a dynamic random access memory (DRAM) 22. CPU 20 is coupled to bus 50 via a memory controller and bias controller 23, which is also coupled to DRAM 22.

IO controller 30 is a single chip input/output (I/O) unit comprising parallel ports, dual serial ports, real-time clock unit, dual programmable interrupt controller, dual DMA controllers, memory mapper and I/O buffers.

Graphic controller 40 is a single chip graphics interface. A flat panel display/CRT 60 is also coupled to graphics controller 40. A video frame buffer 80 (e.g., video memory) is also coupled to graphics controller 40. In one embodiment, frame buffer 80 substantially comprises DRAM devices.

Also coupled to bus 50 in one embodiment of the computer system of the present invention are a hard disk, floppy disk drive, keyboard and basic input/output system (BIOS) controller, all of which are well-known and are not shown to avoid obscuring the present invention.

In one embodiment, docking station 102 has its own power supply which powers all the devices in docking station 102. Docking station 102 may power a pin on connector 104, which the notebook computer 101 uses to power the Vcc power of docking station interface 103 when the notebook computer 101 is in the Cold or the 0-volt Suspend state, which will be described below.

In another embodiment, docking station 102 does not have its own power supply. In such a case, notebook computer 101 provides power to docking station 102 via a switched Vcc source, which powers all the devices in docking station 102. Docking station 102 asserts a signal to docking station interface 103, referred to herein as the DS_PWG signal, as is described below, off the switched Vcc which can be monitored by docking station interface 103. Docking station 102 may have a battery charger, the output of which is connected to the battery charged pin on connector 104.

Docking station interface 103 interfaces computer system 101 to docking station 102. In one embodiment, the docking station may be an ISA-based or PCI-based docking station or both. In one embodiment, docking station interface 103 operates as a PCI-to-PCI bus bridge, interfacing a primary PCI bus of notebook computer 101 to a secondary PCI bus of docking station 102. In such a case, docking station interface 103 contains all the necessary logic to perform PCI-to-PCI translation as well as PCI-to-ISA translation. In one embodiment, docking station interface 103 is part of notebook computer 101.

Docking station interface 103 provides support for the insertion/removal protocol of the present invention. Docking station interface 103 contains registers, power management logic for notebook computer 101, state machine events generation logic, and insertion/removal logic. The power management logic for notebook computer 101 is responsive to and responsible for the generation of power management signals transferred between notebook computer 101 and docking station interface 103. The insertion/removal logic interfaces to a insertion/removal signals coupled between docking station interface 103 and docking station 102.

The following describes various input/output signals of docking station interface 103.

NBPWG—Notebook Power Good: This signal indicates the status of notebook computer 101 power. High means notebook computer 101 is powered up (Normal, or 3 volt suspend), Low means notebook computer 101 is powered down (0 volt suspend or Cold).

NBPWRON—Notebook Power On: This signal is used to turn the notebook computer 101 power on. This controls the notebook computer 101 main power switch.

EXTSMI#—External SMI#: This output signal is asserted low when one or more event are pending to be serviced by the system software, until all events are cleared by system software.

CD1#—Docking Station Connector Detect 1#: The falling of this signal indicates insert detect, and rising of this signal indicates notebook computer 101 is completely removed.

CD2#—Docking Station Connector Detect 2#: The rising of this signal indicates remove detect, and falling of this signal indicates notebook computer 101 is fully seated.

DS_PWG—Docking Station Power Good: This signal indicates the status of docking station 102 power. High means docking station 102 is powered up(Hot), low means docking station 102 is powered down(Cold).

DS_PWRSW—Docking Station Power Switch On or Off Pulse: This active high pulse turns docking station 102 power On (if off) or Off (if on).

DS_SWFN#—Docking Station has capability of Power Switch Function#: This signal indicates whether or not docking station 102 has an electronic power on/off switch capability. If this signal is high, then docking station interface 103 cannot turn (control) the docking station 102 power on/off. If this signal is low, then docking station interface 103 can turn the docking station 102 power on (if off)/off (if on). DS_SWFN bit found in the control states register reflects the state of this pin.

DS_SAFEUDK—Docking Station Safe Undock Pulse: This active pulses unlocks the power door in the docking station 102.

DS_UDKREQ—Docking Station Undock Request: This signal tells docking station interface 103 that a user wants to undock the notebook computer 101 from docking station 102.

Docking Station Connector Pins

The connection between docking station 102 and notebook computer 101 is made via connector pins on connector 104 that mate with docking station interface 103. In one embodiment, the lengths of the connector pins of docking station 102 vary in size and are an integral part of the insertion/removal protocol of the present invention.

Figure 2A:
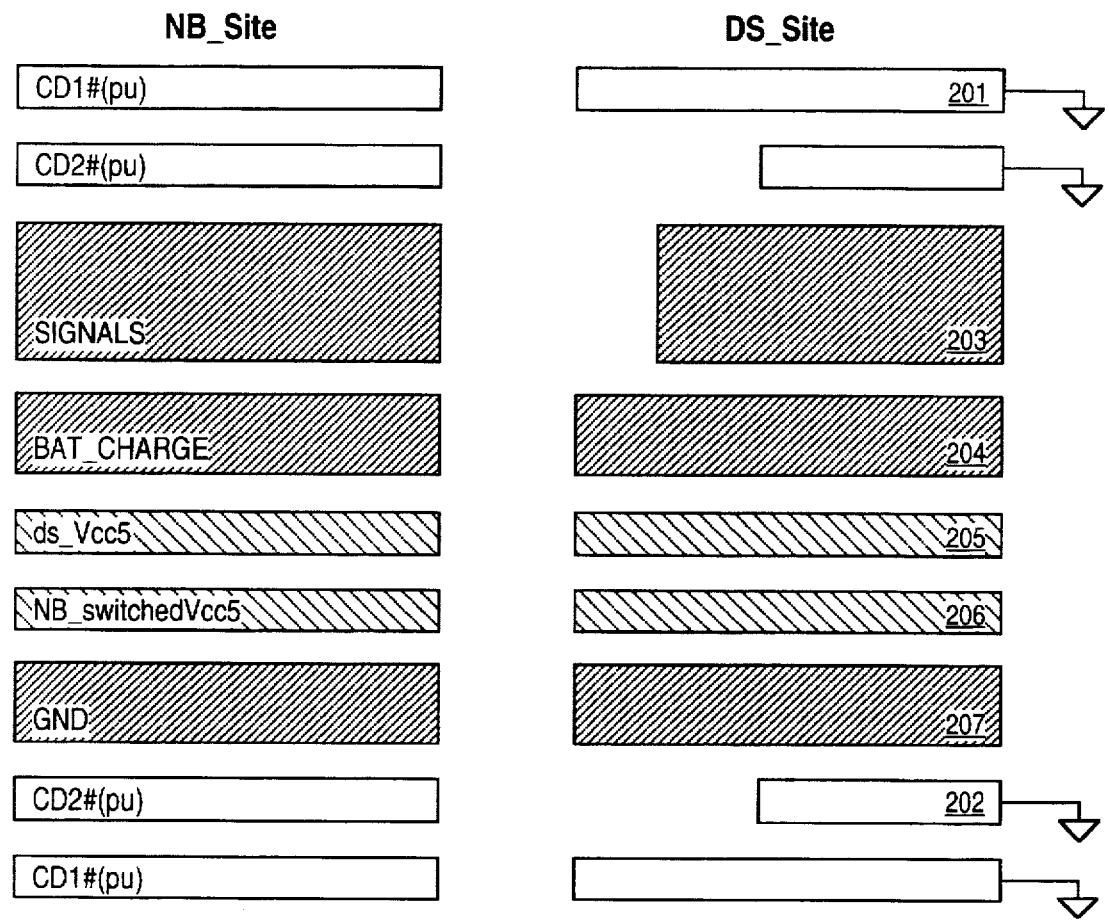
FIG. 2A illustrates one embodiment of the connector pins of the present invention.

FIG. 2A illustrates one embodiment of the connector pins of the present invention. Referring to FIG. 2A, the docking station pins are shown as a CD1# pin 201, a CD2# pin 202, signal pins 203, a battery-charge pin 204, a ds_Vcc5 pin 205, NB_switched_Vcc5 pin 206 and ground pins 207. CD2# pin 202 is shorter than the other pins. With the exception of CD2# pin 202, signal pins 203 are shorter than all other pins. In one embodiment, the distance by which CD2# pin 202 is shorter than signal pins 203 is the same distance that signals pins 203 are shorter than the CD1# pin 201, ground pins 207 and other pins of the docking connector pin layout. The "#" indicates that a signal is active low.

The CD1# pin 201 and CD2# pin 202 are two docking station connector detect signals. The battery_charge signal 204 comprises an input signal that indicates notebook computer 101 has battery charging power. When docking station 102 has its own power supply, the NB_switched_Vcc5 signal is a no connect and the ds_Vcc5 signal provides power to the docking station side interface logic of docking station interface 103. When docking station 102 does not have its own power, the NB-switched_Vcc5 provides power to docking station 102 and the ds_Vcc5 is a no connect. Signal pins 203 includes several insertion/removal management signals that will be described below in conjunction with the insertion/removal protocol of the present invention.

Figure 2B:
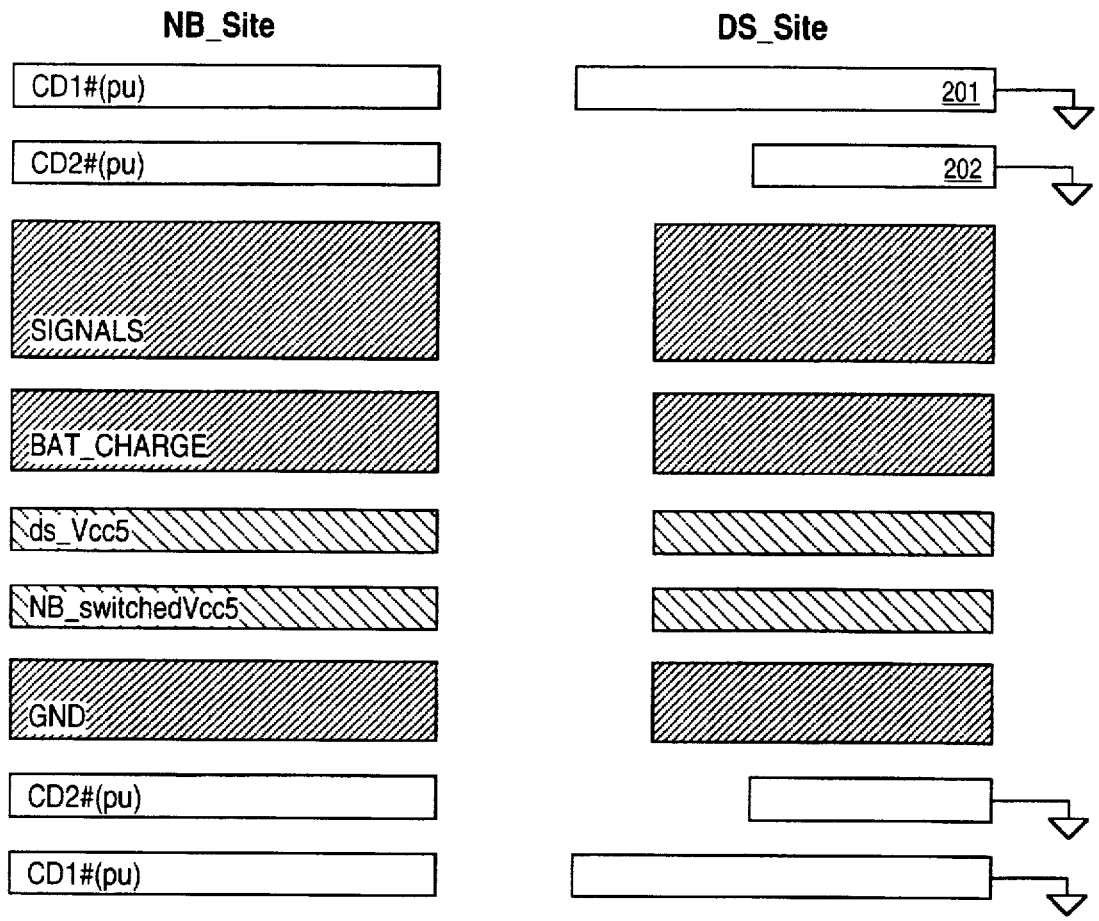
FIG. 2B illustrates an alternate embodiment of the connector pins of the present invention.

FIG. 2B illustrates an alternative embodiment of the connector pin layout of the docking station. Referring to FIG. 2B, CD1# pin 201 is the longest pin, while CD2# pin 202 is the shortest. However, signal pins 203, battery charge pin 204, ds_Vcc5 205, NB-switched_Vcc5 206 and ground signals 207 are the same length, which is between CD1# pin 201 and CD2# pin 202. In one embodiment, the length of these pins falls substantially between CD1# pin 201 and the CD2# pin 202.

The Insertion/Removal Protocol of the Present Invention

Figure 3:
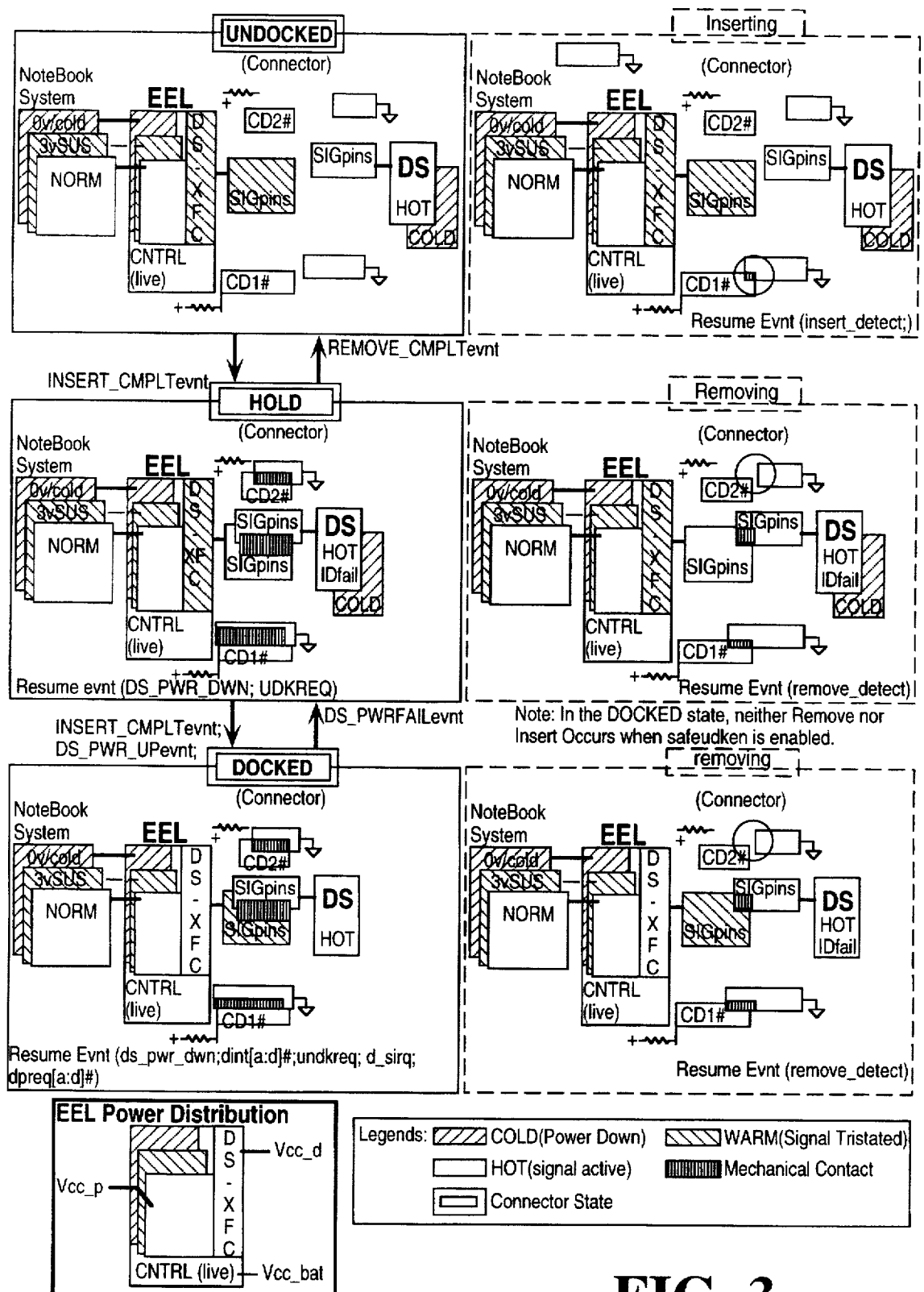
FIG. 3 is a diagram depicting connector states of the present invention.

FIG. 3 illustrates the connector states and events diagram of the present invention. In the present invention, there are three distinct states: undocked, hold and docked. The undocked state is the state in which notebook computer 101 and docking station 102 are not engaged in any way. In the hold state, docking station 102 and notebook computer 101 are fully engaged (e.g., seated). The hold state is a temporary state between the undocked and docked states. However, all signals between the two are electrically isolated (e.g., tri-stated). In the docked state, notebook computer 101 and docking station 102 are fully engaged and the interface between the two is live (i.e., communication may occur between each other).

The present invention generates events for software interactions. Docking station interface 103 detects and generates events of connector 104 to be serviced by system software. In one embodiment, in response to an event being generated, an interrupt or EXTSMI# (programmable) is asserted.

In response to such an event, docking station interface 103 asserts an EXTSMI# signal to I/O controller 30. IO controller 30 generates an SMI interrupt signal in response to the assertion of EXTSMI#. The system management mode (SMM) interrupt handler in CPU 20 handles the SMI signal. The SMM handler examines IO controller 30 (e.g., examining storage or other well-known circuitry) to determine the source of SMI interrupt. If the source of SMI interrupt is from some type of request to enter the docked state, the SMM handler takes the necessary steps to configure the system. One method of determining the source is to check register bits stored in IO controller 30 and register bits stored in docking station interface 103.

Docking station interface 103 keeps track of the states of notebook computer 101, docking station 102 and connector 104 in order to support an insertion and removal protocol without manual preconditioning. Notebook computer 101 has three states which docking station interface 103 monitors. These states are the normal state in which notebook computer 101 is powered up and fully functional; A three-volt suspend state in which notebook computer 101 is partially powered up to hold data and wait for resume events; and a zero volt suspend state in which notebook computer 101 is powered down and waits for resume events and a cold state in which notebook computer 101 is powered down and waits for power to be switched on. Docking station 102 has three states: the normal state in which docking station 102 is powered up and accepts accesses: an access denied state in which docking station 102 is powered up but denies access rights; and a cold state in which docking station 102 is powered down.

An event detected by docking station interface 103 while notebook computer 101 is in the suspend or cold state is a resume event which resumes notebook computer 101 or automatically turns on the power of notebook computer 101 if it is in the cold state. A connector event register in docking station interface 103 contains the state of the resume event. The source of the resume event is in a notebook resume event source register in docking station interface 103. Sources of resume events include: insertion of notebook computer 101 into docking station 102, which is an insert detect created to resume notebook computer 101 if notebook computer 101 is in the suspend state or to turn on notebook computer 101 if it is in the cold state; a DS_PWRUP_RSM, which is a docking station power up created to resume notebook computer 101; a UDKREQ_RSM, which is an undocked request created to resume notebook computer 101 if notebook computer 101 is in the suspend state.

An event detected by docking station interface 103 while notebook computer 102 is in the normal state is called a normal event that is used for insertion/removal management. These events include the remove_complete event (remove completed event), the insert_complete (insert completed event), DS_PWRFAIL (docking station power fail event), DS_PWRUP (docking station power up event), and UDKREQ (undocked request event). The connector event register in docking station interface 103 contains the state of these connector events.

Figure 4:
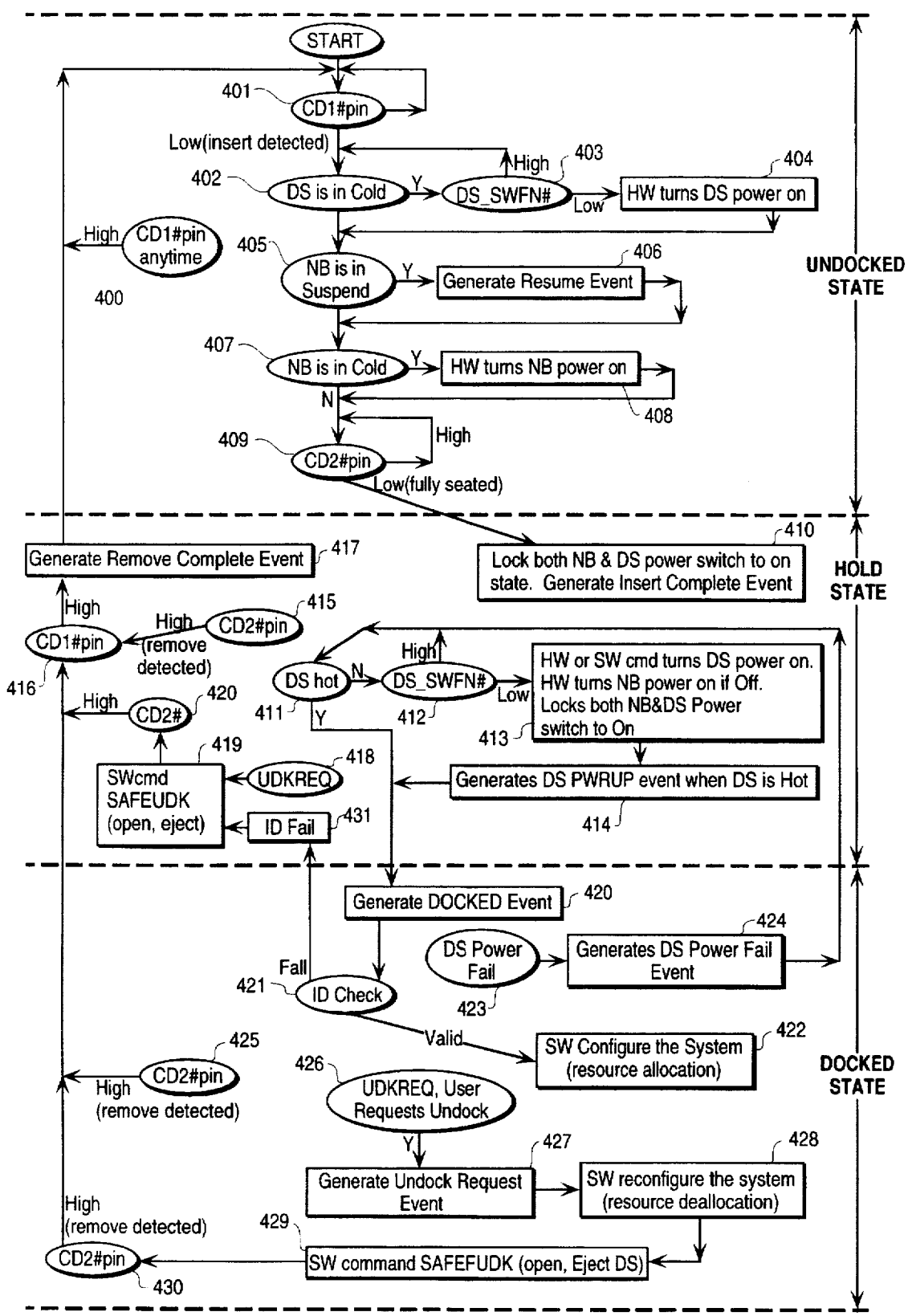
FIG. 4 is a flow diagram depicting insertion and removal of the notebook computer from the docking station.

FIG. 4 is a combination flow/state diagram illustrating the insertion/removal process of the present invention. In one embodiment, this is controlled by processing logic, which may include hardware and/or software, in docking station interface 103. Prior to docking (i.e., in the undocked state), the CD1# and CD2# pin receptors of docking station interface 103 are initially at a high state. The CD1# pin 201 and CD2# pin 202 of connector 104 are coupled to ground. The external interface of docking station interface 103 is disabled (e.g., tri-stated). Referring to FIG. 4, when notebook computer 101 is in the undocked state, and is inserted into docking station 102, the insertion is detected by the CD1# pin, which is the longest of the connector pins, going low (processing block 401). When this occurs, docking station 102 is checked to determined if it is in the cold state (processing block 402). Until docking station 102 is powered up, the system does not leave the undocked state.

If docking station 102 is cold, a test determines whether docking station 102 has electronic switch capability to turn on its own power (processing block 403). This is indicated by the DS_SWFN# pin. In one embodiment, if the DS_SWFN# pin is low, the software of docking station 102 controls its hardware to turn its power on (processing block 404). If the DS_SWFN# pin is high, processing loops back and waits until docking station 102 is turned on by manual switch. Therefore, until a manual switch has been set, docking station 102 remains in the cold state.

If the docking station is not cold (i.e., once docking station 102 has been powered up), processing logic determines whether notebook computer 101 is in the suspend state (processing block 405). If notebook computer 101 is in the suspend state, a resume event is generated (processing block 406).

If notebook computer 101 is not in suspend state or after the resume event has been generated, the processing logic tests whether notebook computer 101 is in the cold state (processing block 407). In one embodiment, docking station interface 103 monitors the state of notebook computer system by using the NB_PWG signal which indicates if notebook computer 101 is powered. To reiterate, when the resume event occurs, an interrupt is generated, which wakes up notebook computer 101. After powering up, notebook computer 101 is in the same state it was at when it enters the suspend state.

If notebook computer 101 is not suspended or after notebook computer 101 has woken up, processing logic determines whether notebook computer 101 is cold (processing block 407). If notebook computer 101 is cold, hardware turns the power for notebook computer 101 on (processing block 408). Otherwise, processing continues. At this point, notebook computer 101 and docking station 102 are both powered up and processing logic tests whether the CD2# pin has gone low to indicate that notebook computer 101 is fully seated into docking station 102 (processing block 409).

Once the CD2# pin has gone low, indicating that notebook computer 101 is fully seated into docking station 102, the system transitions into the hold state. At this point, processing continues at processing block 410 where the power switch of notebook computer 101 and docking station 102 is switched to the on state and an insert complete event is generated. It should be noted that because both the power switch is locked in the on state, both notebook computer 101 and docking station 102 no longer power up manually.

Note that if in the undocked state, the CD1# pin goes high at anytime, the process loops back to the beginning (processing logic 400).

Once in the hold state, there are many different events that may occur to cause the system to exit to the hold state. If any one occurs, the system transitions out of the hold state to either the docked state or the undocked state.

If notebook computer 101 and docking station 102 are powered up during tranistioning from the undocked state to the hold state, the processing logic tests the docking station to determine if it is hot (processing block 411) and if so, transitions the system into the docked state. Therefore, in this case, the system transitions almost directly from the undocked to the docked state.

If for some reason docking station 102 does not power up, processing logic determines whether docking station 102 has electronic switch capability (processing block 412). As discussed above, this is tested by the DS_SWFN# signal by low. If the DS_SWFN# signal is low, the hardware or a software command turns the docking station 102 power on (processing block 413). The hardware may also turn notebook power 101 on if it is off. Also, the power switch of both notebook computer 101 and docking station 102 is locked on. After this, a power-up event (DS_PWRUP) is generated when docking station 102 is hot (processing block 414) and then the system transitions into the docked state.

If, on the other hand, docking station 102 does not have electronic switch capability, then the processing logic loops back and waits in the hold state until docking station 102 is powered on via manual switch.

While in the hold state, if the CD2# pin goes high indicating that notebook computer 101 is potentially being removed, processing logic determines when the CD1# pin is high (processing block 416). When the CD1# pin is high, the system generates a remove complete event (processing block 417) and the system transitions into the undocked state.

Also, while in the hold state, if the user makes an undock request, an interrupt is generated causing a software command to be executed to open the door of docking station 102, eject notebook computer 101 and make the system safe for undocking (processing block 419). At that point, processing logic determines if the CD2# pin is high (processing block 420). If it is, processing logic tests whether the CD1# pin is high, as discussed above. At that point (in processing block 416), a remove complete event is generated (processing block 417) and the system returns to the undocked state.

Once the system enters the docked state, a docked event is generated (processing block 420). When the interrupt corresponding to the docked event occurs, software performs an ID check to determine the ID password to ensure that it is valid (processing block 421). If it fails, the system transitions into the hold state. If the ID check is valid, software configures the system (processing block 422). The software locates and allocates resources. This includes initializing hard drives and other such devices. At this point, both docking station 102 and notebook computer 101 are fully operational.

While in normal operation, three cases may occur to cause the system to exit the docked state. First, the docking station power may fail (processing block 423). Second, the user may request to be undocked (processing block 426). Third, the system may be removed from the docking station (processing block 425).

When a user wishes to undock, he may, for example, press a button, which causes an undock request event to be generated (processing block 427). In response to the undock request event, software reconfigures the system (processing block 428), thereby performing resource deallocation. If operations are occurring, the software waits until the operations are completed before reconfiguring the system. For instance, if a hard disk access is occurring, the software waits until the hard disk access is completed before reconfiguring the system. The results of the resource deallocation process are that all the resources are no longer visible to notebook computer 101.

After software has reconfigured the system, a software command is generated for safely undocking. In response to the software, the safe undock software command causes the door of docking station 102 to open and notebook computer 101 to be ejected (processing block 429). When ejecting the docking the station, the CD2# pin goes high indicating that a remove has been detected (processing block 430). When this occurs, the system moves into the hold state where it remains (until the CD1# pin goes high indicating that notebook computer 101 has been completely removed from docking station 102).

While in normal operation, if notebook computer 101 is removed, the CD2# pin will go high (processing block 425) and a system transitions from the docked state to the hold state, whereupon the system may move to the undocked state as soon as the CD1# pin goes high and the remove complete event is generated.

In a normal operation of the dock state, a docking station power failure may occur. This may occur when a the A/C connector docking station 102 has been removed from the wall. If the docking station power failure occurs, a docking station power fail event is generated and the system transitions from a docked state to the hold state where a test determines whether the docking station 102 is powered up.

Note that if notebook computer 101 is depending on docking station 102 for power, any loss of the power to docking station 102 results in the loss of power in notebook computer 101. In this case, hardware turns docking station 102 power on and the hardware turns notebook computer 101 power on. On the other hand, if notebook computer 101 is being powered by a battery source or other source separate from docking station 102 and docking station 102 loses power, notebook computer 101 can execute a software command to turn on docking station 102 power.

If, after generating the docked event, the ID check fails, the system moves to the hold state at processing block 422. The ID may fail, for instance, when a password does not match the password accepted by the system. The ID may also fail where docking station 102 and notebook computer 101 are not compatible with each other. Once it fails, software is aware that the ID check has failed and can command that the door to docking station 102 is opened and that notebook computer 101 be ejected. In an alternate embodiment, software can prompt the user to open a door and remove notebook computer 101. Alternatively, when the ID check has failed, the user may depress a button to cause undocking.

Note that in both the hold state and the docked state, notebook computer 101 could go into suspend mode. This can occur when no keys have been depressed after a certain amount of time or there has been no network access, etc. If notebook computer 101 does go into suspend, it may resume itself due to, for instance, the depressing of a key on the keyboard. With respect to FIG. 4 above, the operations may occur; however the notebook computer must be resumed before the processing may be performed.

When in a hold state and after the docking station has powered up, the power-up event generated when docking station 102 is hot resumes notebook computer 101 as if it has gone into the suspend mode during the hold state. Therefore, all the events that occur become resume events to resume notebook computer 101 first if notebook computer 101 is in the suspend state.

Notebook Computer Auto (Hardware) Power On and Resume

When notebook computer 101 is in the cold state, it may be powered up by turning on a main switch or through the use of a pin, NB_PWRSW, on docking station interface 103 when inserted. Docking station interface 103 automatically turns the power to notebook computer 101 on when notebook computer 101 is inserted if notebook computer 101 was powered off (i.e. is in the cold state) while connector 104 is in the undocked state. To reiterate, the insertion of notebook computer 101 is indicated by the falling of CD1# pin 201. In one embodiment, docking station interface 103 automatically turns on notebook computer 101 if all of the following conditions are met. First, notebook computer 101 is powered off (e.g., in the cold state). This is indicated by the NB_PWG signal being low. Second, connector 104 is in the undocked state and an insert sequence has been detected. In one embodiment, the insertion of notebook computer 101 into docking station 102 is detected by CD1# pin 201 being pulled down. Third, the Vcc_d pin of docking station interface 103 is powered. In one embodiment, docking station interface 103 internally senses the state of the pin to determine if it is powered.

In one embodiment, docking station interface 103 includes a control register with one or more bit locations that when set enable the automatic hardware power on of notebook computer 101. In one embodiment, a bit location in the control register is set to a 1 to enable the hardware automatic power on of notebook computer 101.

Notebook computer 101 is automatically powered on in response to a resume command that occurs when it is inserted into docking station 102. While notebook computer 102 is in the suspend state, either a 3-volt suspend state or a 0-volt suspend state, docking station interface 103 generates an event(s) to resume notebook computer 101. This occurs if docking station interface 103 detects events, such as the insert_detect event, remove_detect event, etc., described above. The resume event causes docking station interface 103 to generate a resume signal to I/O controller 30. In one embodiment, the resume signal comprises an external system management interrupt (ExtSMI). In response to a resume signal, I/O controller 30 indicates the power supply of notebook computer 101 to supply power to notebook computer 101.

Note that turning on power is well-known in the art.

Automatic Hardware Controlled Docking Station Power On

Docking station interface 103 automatically turns on the power of docking station 102 when notebook computer 101 is inserted if notebook computer 101 was powered off in the cold state, notebook computer 101 has no main battery, and the DS_Vcc5 signal from docking station 102 has no power. Docking station 102 has electronic power switch capability, in which an electronic power switch of docking station 102 is able to respond to docking station interface 103 commands. In one embodiment, the power switch is responsive to a DS_PWRSW signal.

As discussed above, docking station interface 103 knows when notebook computer 101 is inserted into docking station 102 by detecting the CD1# pin 201 being pulled to ground. Docking station interface 103 detects notebook computer 101 is in the cold state by determining the NB_PWG signal is low. The Vcc_d pin of docking station interface 103 has no power as indicate by docking station interface 103 internally sensing the Vcc_d pin and the DS_SWFN# pin is low.

If all the conditions are met, docking station interface 103 asserts the DS_PWRSW signal high and deasserts it when the DS_PWG signal becomes active.

In one embodiment, the automatic hardware control docking station power on feature of the present invention is enabled by setting one or more bits in a control register in docking station interface 103.

A Software Control Docking Station Power On/Off

Docking station interface 103 provides a pin, referred to herein as DS_PWRSW, to turn on and off the docking station power. The DS_PWRSW pin is controlled by software. In one embodiment, software writes a 1 to the DS_PWRSW bit found in a control register in docking station interface 103. System software checks the DS_SWFN bit found in a connector status register before writing a 1 to the DS_PWRSW bit to turn on and off the power of docking station 102. The DS_SWFN bit indicates whether or not docking station 102 responds to the DS_PWRSW signal. The power on feature in the present invention is used to turn on the power to docking station 102 when connector 104 is in the hold state but docking station 102 is in the cold state. In one embodiment, docking station 102 is determined to be cold when the DS_PWG bit in the connector status register is low. To turn on the power of docking station 102, software writes a 1 to the DS_PWRSW bit, docking station interface 103 asserts the DS_PWRSW signal high and then docking station interface 103 deasserts it when the DS_PWG signal becomes high.

In one embodiment, the software controls docking station power on feature of the present invention may be enabled or disabled. In one embodiment, a bit in the control register is set to enable the software control docking power on and off feature.

If a docking station power failure occurs, the system moves into the hold state. At this point, docking station 102 side of docking station interface 103 is tri-stated and a DS_PWRFAIL occurs.

If the docking station power failure event occurs, docking station 102 cannot be accessed and software prevents accesses to docking station 102.

If the power fails and back up, the DS_PWRUP signal is generated. In response to the signal, the docking station power up event is generated.

The Connector Control Register of the Docking Station Interface

Docking station interface 103 includes a control register used to control the operation of docking station interface 103. One embodiment of the control register bit locations and their assigned control function is described below:

ID_VALID-Identy Valid (Bit 1)—While this bit is set to 1 and the IDCHKEN bit is set to 1 and connector 104 is in the Docked state, docking station interface 103 allows any access to/from docking station 102. While this bit is a 0 and the IDCHKEN bit is a 1 and the connector is in the Docked state, docking station interface 103 enables only a serial ID interface until a write occurs to the IDVALID bit in the Connector Control register setting it to 1. During this period, software validates the user id, the docking station id, configurations, etc. If the conditions are met (dockable), software writes a 1 to the IDVALID bit. When this bit is set to 1, docking station interface 103 allows any access across connector 104, such that resources (if enabled) on notebook computer 101 are available to docking station 102 and resources of docking station 102 are available to notebook computer 101. If conditions are not met, software writes a 0 to the IDVALID bit, docking station interface 103 does not permit accesses across connector 104 and docking station interface 103 enters into the HOLD state, such that resources on notebook computer 101 are not available to docking station 102 and resources of docking station 102 are not available to notebook computer 101. At this point, software prompts the user for proper action (e.g., prompting the user to remove the notebook computer). When this bit is set to 0, docking station interface 103 disallows any access to/from docking station 102 and tristates signals on connector 104 while the IDCHKEN bit is a 1. This bit is ignored if the IDCHKEN Bit is 0. While connector 104 is in the Docked State, if the IDCHKEN bit is low (found in the connector control register), docking station 103 interface enables all of docking station interface 103 while connector 104 is in the Docked state, independent of the state of the IDVALID bit.

IDCHKEN—Identity Check Enable (Bit 2)—While this bit is set to 0, the ID_VALID bit is ignored and docking station interface 103 assumes Identity is valid and allows any access to/from docking station 102.

SAFEUDK—Safe Undock (Bit 3)—When this bit is set to 1, docking station interface 103 asserts the SAFEUDK signal to docking station 102. When a 0 is written to this bit location, the SAFEUDK signal is deasserted. Software monitors the pulse width of SAFEUDK signal to ensure it remains at a minimum (e.g., minimum 32us). Docking station 102 will unlock the power door which is inside docking station 102. At the same time, docking station interface 103 tristates docking station interface 103. This bit is ignored (i.e., docking station interface 103 forces SAFEUDK signal to low independent of the state of this bit) if SAFEUDKEN is a 0.

SAFEUDKEN—Safe Undock feature Enable (Bit 4)—While this bit is a 1, the SAFEUDK feature of the present invention is enabled. While this bit is set to 0, docking station interface 103 assumes notebook computer 101 will be removed any time. While the SAFEUDKEN bit is low and connector 104 is in the Docked state, docking station interface 103 waits for the removal of notebook computer 101 to be detected (rising of the CD2# pin 202). Then connector 104 moves to the Hold state which disables docking station interface 103. In one embodiment, docking station interface 103 does not guarantee safe undock. However, docking station interface 103 prevents any physical damage from occuring.

NBAUTOPWREN—Notebook Auto Power On Enable (Bit 5)—This bit enables/disables the notebook computer auto power on feature of the present invention if the bit location is set to 1 or 0 respectively. While this bit is set to 1, docking station interface 103 automatically turns the notebook computer power on when the notebook computer is inserted if notebook computer was powered off (cold) while the connector is in the Undocked state. In one embodiment, this is indicated to docking station interface 103 by the falling of CD1# pin 201. Docking station interface 103 automatically turns the notebook computer power on when the docking station is powering up and the notebook computer was powered down (cold) due to the docking station being power down. In this case, the notebook computer has no main_battery and is powered by the battery charge of docking station 102. When docking station 102 is powering down, the notebook computer also is powering down as the power for the notebook computer power is received from the battery charge of docking station 102. When the docking station is powering up, the notebook computer cannot be powered up unless the user manually turns on the notebook computer. Docking station interface 103 also provides auto notebook computer power on in this situation.

DS_PWRSW—Software Controlled Docking Station Power Switch on/off (Bit 6)—When this bit is set to 1, docking station interface 103 asserts the DS_PWRSW signal to the docking station. The docking station power supply controller of docking station 102 turns on the power of docking station 102 (if the power is off) or OFF (if the power is on). Docking station interface 103 deasserts DS_PWRSW signal when the state of DS_PWG is changed. This bit is cleared when docking station interface 103 deasserts the DS_PWRSW signal. Note that software checks the state of the DS_SWFN bit=1 (in the connector status register) before writing a 1 to the DS_PWRSW bit. An active DS_PWRSW turns on the power of docking station 102 while the DS_PWG bit is set to 0 or turns off the power of docking station 102 while the DS_PWG bit is set to 1. This bit is ignored if the DS_PWRSWEN bit is set to 0, such as when, for instance, docking station interface 103 forces the DS_PWRSW signal to low independent of the state of this bit.

The DS_SWFN bit indicates whether or not docking station 102 has a electronic power on/off switch capability. If this bit is low, then docking station interface 103 cannot turn the power on/off of docking station 102. If this bit is high, then docking station interface 103 can turn the power on (if the power is off)/off (if the power is on) of docking station 102.

DS_PWRSWEN—Docking Station Power Software Enable (Bit 7)—While this bit is a 1 or 0, the software controlled docking station power ON/OFF feature of the present invention is enabled or disabled, respectively.

DS_AUTO_PWRSWEN—Docking Station Auto Power On Feature Enable (Bit 8)—While this bit is a 1 or 0, the hardware controlled auto docking station power on of the present invention is enabled or disabled, respectively.

SUS_STAT0v—0volt Suspend (Bit 9)—System software write a 1 to this bit when the notebook computer is put in the 0v suspend state by system software. This bit is cleared when the SMB_SUS# (pin) goes inactive.

CON_CNTRL_EN—Master Connector Control Register Feature En. (Bit 10)—Setting this bit to 1 enables the connector control register, while setting it to 0 disables the connector control register.

In one embodiment, bits 15:11 and bit 0 are reserved and may be set to 0.

The Connector Event Register of the Present Invention

The connector event register contains multiple bit locations. Events are indicated to docking station interface 103 by setting one or more of the bit locations in the connector event register. One embodiment of the connector event register contains the following bit designations:

RSM—Resume Event (Bit 0)—This bit is set to a 1 when docking station interface 103 detects an event while the notebook computer is in a suspend state (e.g., the 3 V suspend, 0 V suspend) or COLD state. In response, docking station interface 103 asserts the EXTSMI# signal or an IRQx until this bit is cleared (e.g., set to 0). The source(s) of the Resume Event is identified in a register, referred to herein as the resume-event source register. This bit is cleared when all the bits in the Resume Event Source register are cleared.

REMOVE_COPLT—Removal Completed Event (Bit 1)—This bit is set to a 1 when the notebook computer is completely removed.

INSERT_CMPLT—Insert Completed Event (Bit 2)—This bit is set to a 1 when the notebook computer is fully seated.

DS_PWRFAIL—Docking Station Power Fail Event (Bit 3): This bit is set to a 1 when the docking station power fail condition has been detected. In one embodiment, the power fail condition of the docking station is detected at the falling edge of DS_PWG signal.

DS_PWRUP—Docking Station Power Up Event (Bit 4)—This bit is set to a 1 when the docking station power up condition has been detected. In one embodiment, the power up condition of the docking station is detected at the rising edge of the DS_PWG signal.

UDKREQ—Undock Request (Bit 5)—This bit is set to a 1 when the UDKREQ signal becomes active from inactive while the connector is either in the HOLD or DOCKED state.

In one embodiment, bits 15:6 are reserved and may be set to 0.

The Resume Event Source Register of the Notebook Computer

The resume event source register of the notebook computer contains multiple bit locations, each of which is set to indicate one particular source of a resume event to which docking station interface 103 responds. One embodiment of the resume event source register contains the following bit designations:

REMOVE_DETECT_RSM—Remove Detect Caused to Resume the Notebook Computer (Bit 0)—This bit is set to a 1 when the notebook computer is being removed while the notebook computer is in the Suspend or Cold state. In one embodiment, the rising edge of CD2# pin 202 causes this bit to be set.

INSERT_DETECT_RSM—Insert Detect Caused to Resume the Notebook Computer (Bit 1)—This bit is set to a 1 when the notebook computer is being inserted while the notebook computer is in the Suspend or Cold state. In one embodiment, the falling edge of CD1# pin 201 causes this bit to be set.

DS_PWRFAIL_RSM—Docking Station Power Fail Caused to Resume the Notebook Computer (Bit 2)—This bit is set to a 1 when docking station power fail condition has been detected while notebook computer 101 is in Suspend or Cold state. In one embodiment, this bit is set in response to the occurrence of the falling edge of DS_PWG signal.

DS_PWRUP_RSM—Docking Station Power Up Caused to Resume the Notebook Computer (Bit 3)—This bit is set to a 1 when docking station 102 power up condition has been detected while notebook computer 101 is in the suspend or cold. The power up condition is detected at the rising edge of the DS_PWG signal.

UDKREQ_RSM—Undock Request caused to Resume the Notebook Computer (Bit 4)—This bit is set to a 1 when the UDKREQ signal becomes active from inactive while the notebook computer is in Suspend or Cold.

In one embodiment, bits 15:5 are reserved and are set to 0.

Note that also in one embodiment, each bit is cleared when the register is read.

Also, in one embodiment of the present invention, docking station interface 103 includes a configuration register that allocates interrupts for generation in response to specific events.

Similarly, in one embodiment, the notebook computer resume event select register allows resume events to be specified to which the computer system will be responsive.

The Connector Status Register of the Present Invention

Undocked (Bit 0)—The notebook computer has no mechanical contact to docking station 102 and docking station interfaces's bus to connector 104 is either tristated or powered down. In one embodiment, software can put the docking station interface 103 in sleep mode by writing a 1 to Sleep bit found in the connector control register. In this state, the notebook computer can be inserted into the docking station 102. When insertion is completed, connector 104 enters into either Hold state (if docking station 102 is not powered) or Docked state (if docking station 102 is already powered).

Hold (Bit 1)—The notebook computer is fully seated on connector 104 but docking station interface's to bus connector 104 is tristated which makes electrical isolations. Software can put the docking station interface 103 in sleep mode by writing a 1 to Sleep bit found in the connector control register. In this state, the notebook computer can be removed from docking station 102 if the docking station power door is open. When removal is completed, connector 104 enters into Undocked state. In this state, when docking station 102 becomes powered up, connector 104 enters into Docked State.

Docked (Bit 2)—The notebook computer is fully seated on the connector and docking station interface's to bus connector 104 is active which makes electrical connection. In this state, the notebook computer cannot be removed from docking station 102 (if the SAFEUDKEn bit is 1 in the connector control register). When docking station 102 power door is opened, the docking station ID is failed, or the docking station had a power fail, connector 104 enters into the Hold state.

DS_PWG—Docking Station Power Good (Bit 3)—When this bit is set to 1, it indicates that docking station 102 is powered up (hot). When this bit is set to 0, it indicates that docking station 102 is powered down.

DS_SWFN—(Bit 4)—This bit indicates whether or not docking station 102 has an electronic power on/off switch capability. If this bit is low, then docking station interface 103 cannot turn docking station 102 power on/off. If this bit is high, then docking station interface 103 can turn docking station 102 power on (if off)/off (if on). The state of the DS_SWFN bit reflects the inverse state of DS_SWFN# pin.

In one embodiment, bits 8:5 are reserved and are set to 0.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, references to details of various embodiments are not intended to limit the scope of the claims which in themselves recite only those features regarded as essential to the invention.

Thus, a method and apparatus for inserting and removing a notebook computer system to or from a docking station, respectively, has been described.

We claim:

1. A system comprising:

a portable computer;

a docking station;

an interface coupled to the portable computer and the docking station, wherein the interface, responsive to un-preconditioned insertion or removal of the portable computer into or from the docking station respectively, generates events to allow software to configure the portable computer and the docking station without prior user intervention, including events to allow configuration of the portable computer and the docking station for insertion and removal while the portable computer is in an active state.

2. The system defined in claim 1, wherein the docking station comprises a connector having a plurality of pins, wherein one of the plurality of pins is shorter than other pins, and further wherein the interface detects removal of the portable computer from the docking station and generates an event indicative of the removal as soon as an electrical connection between said one pin and the interface no longer exists.

3. The system defined in claim 1 wherein the docking station comprises a connector having a first pin and a second pin shorter than the first pin, and further wherein the interface detects insertion of the portable computer into the docking station and generates an event indicative of the insertion when a first electrical connection occurs between the first pin and the interface prior to a second electrical connection occurring between the second pin and the interface.

4. A system comprising:
a portable computer;
a docking station comprising a connector including a first pin and a second pin shorter than the first pin;
an interface coupled to the portable computer and the docking station, comprising, processing logic that controls insertion of the portable computer to and removal of the portable computer from, the docking station, the processing logic determining a position of the docking station with respect to the portable computer from states of signals on the first and the second pins and generating events to configure the portable computer and the docking station accordingly, including events that configure the computer for insertion and removal while software applications are active on the portable computer.

5. A method for automatic un-preconditioned insertion and removal of an active portable computer from a docking station, said method comprising the steps of:
monitoring states of the portable computer and the docking station;
detecting when one a first docking station connector pin changes state;
generating a first event in response to detection of a state change in said first docking station connector pin; and
configuring the portable computer and the docking station for insertion in response to the first event.

6. The method defined in claim 5 further comprising the steps of:
detecting when a second docking station connector pin having a shorter length than the first docking station connector pin changes state;
generating a second event in response to detection of a state change in said second docking station connector pin; and
configuring the portable computer and the docking station for removal in response to the second event.

7. The method of claim 5, further comprising the steps of:
detecting a condition of the portable computer; and
controlling a supply of power to the portable computer in response to the condition of the portable computer.

8. The method of claim 7, further comprising the steps of:
detecting a condition of the docking station; and
controlling a supply of power to the docking station in response to the condition of the docking station.

9. A computer system comprising:
a portable computer including a bus; and an interface coupled to the bus and for coupling to a docking station, wherein the interface, responsive to un-preconditioned insertion or removal into or from the docking station respectively, generates events to allow software to configure the portable computer and the docking station without prior user intervention, including events that configure the portable computer and the docking station for insertion or removal while applications are active on the portable computer.

10. The system defined in claim 9 wherein the docking station comprises a connector having a plurality of pins, wherein one of the plurality of pins is shorter than other pins, and further wherein the interface detects removal of the portable computer from the docking station and generates an event indicative of the removal as soon as an electrical connection between said one pin and the interface no longer exists.

11. The system defined in claim 9 wherein the docking station comprises a connector having a first pin and a second pin shorter than the first pin, and further wherein the interface detects insertion of the portable computer into the docking station and generates an event indicative of the insertion when a first electrical connection occurs between the first pin and the interface prior to a second electrical connection occurring between the second pin and the interface.

12. The system defined in claim 9 wherein the interface comprises a bus bridge.

13. An interface for coupling an active computer to a docking station, the interface comprising:
a first input for receiving a signal indicating a connection status with the docking station;
a second input for receiving a signal indicating a power status for the computer;
a third input for receiving a signal indicating a power status for the docking station; and
processing logic coupled to the first, second, and third inputs, for generating an event signal according to the power status signals on the second and third inputs, when the connection status signal indicates that the interface is in electrical contact with the docking station.

14. The interface of claim 13, wherein the first input comprises a first pin input for receiving a signal indicating that the computer is inserted into the docking station and a second pin input for receiving a signal that the computer is seated in the docking station.

15. The interface of claim 14, wherein the processing logic generates an insert complete event when the docking station and computer are in powered-on states and the second pin input indicates that the computer is fully seated.

16. The interface of claim 13, wherein the processing logic includes power management logic having power management outputs coupled to the computer and the docking station, for adjusting the power status of the computer and docking station in accordance with the power status signals.

17. An interface for coupling an active computer to a docking station without prior user intervention, the interface comprising:
signal inputs for detecting power status signals from the computer and docking station; and processing logic coupled to the signal inputs for configuring the computer and docking station according to the detected power status signals for coupling the active computer to the docking station.

18. The interface of claim 17, wherein the processing logic is coupled to an I/O controller of the computer through a signal output, for triggering configuration software in the computer.

19. The interface of claim 17, further comprising bridge logic for coupling data signals between the computer and the docking station once the processing logic has configured the computer and docking station.

20. An interface for coupling a computer to a connector port of a docking station, the interface comprising:

a first plurality of inputs for receiving signals from the connector port of the docking station;

a second plurality of inputs for receiving signals from the computer;

processing logic coupled to the first and second plurality of inputs for determining power states of the docking station and computer from the signals received on the first and second inputs, and for generating control signals responsive to the determined power states; and a first control signal output for coupling selected control signals between the processing logic and the docking station to adjust the power state of the docking station.

21. The interface of claim 20, further comprising a second control signal output for coupling selected control signals between the processing logic and the computer to adjust the power state of the computer.

* * * * *